Nov. 18, 1941.  F. A. BUCKLIN  2,262,882
SLICING MACHINE
Filed April 13, 1940   2 Sheets-Sheet 2
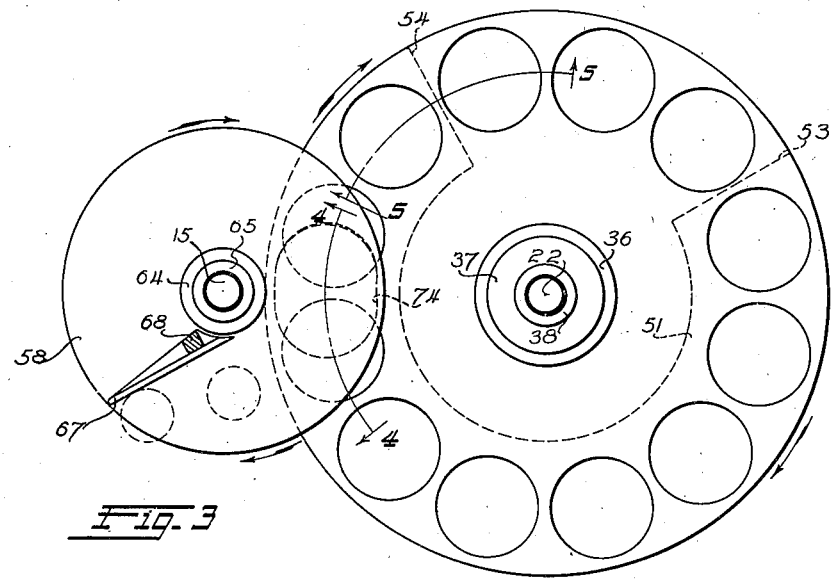
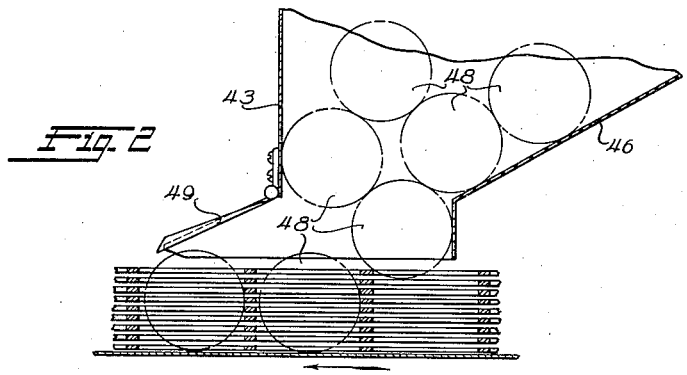
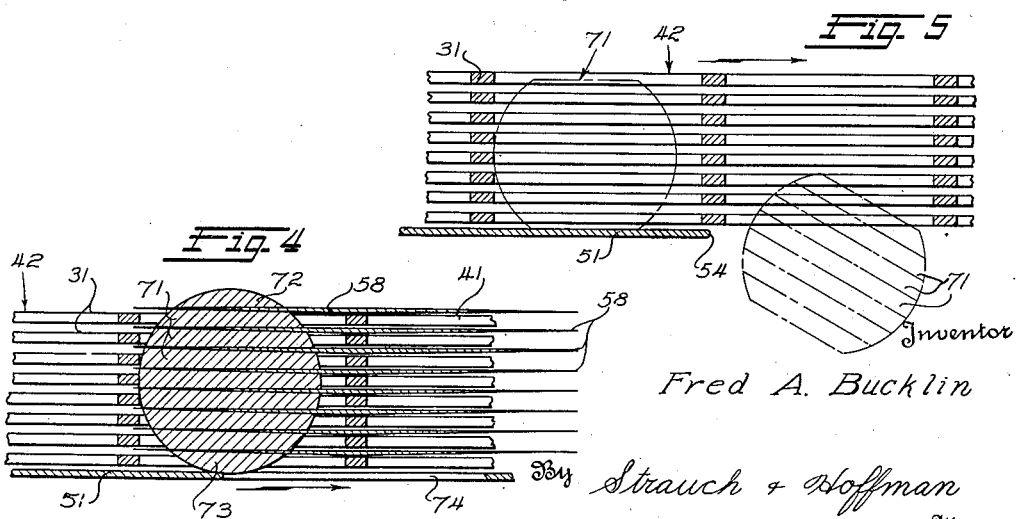
Inventor
Fred A. Bucklin
By Strauch & Hoffman
Attorneys Patented Nov. 18, 1941

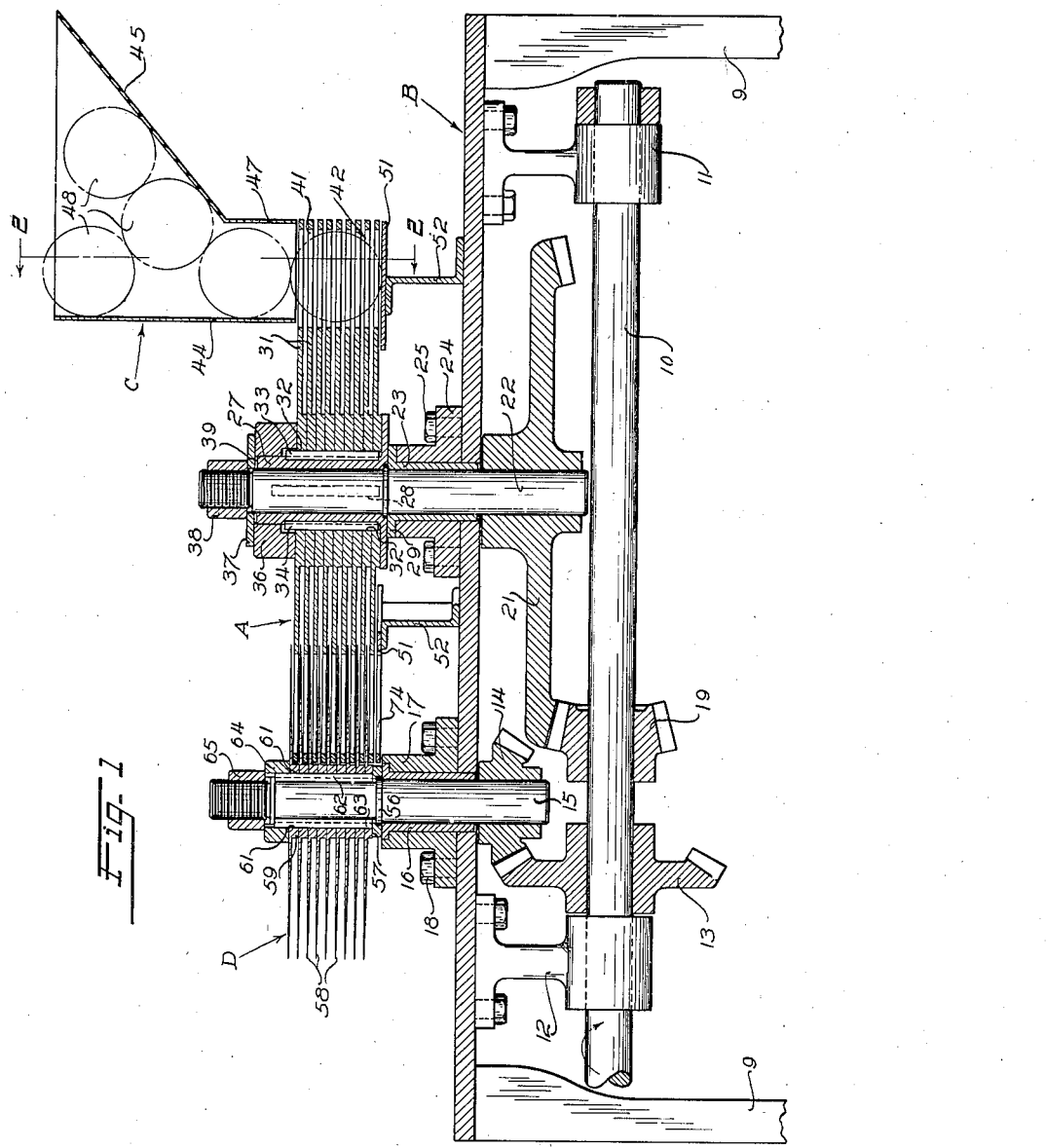

2,262,882

UNITED STATES PATENT OFFICE 2,262,882

SLICING MACHINE

Fred A. Bucklin, Geneva, N. Y.

Application April 13, 1940, Serial No. 329,555

4 Claims. (Cl. 146—98)

The present invention relates to slicing machines and more particularly to machines for slicing vegetables and separating the top and bottom or two end slices from the center slices.

In preparing certain vegetables for commercial canning, as for instance, beets, they are preferably cut into a plurality of slices, and in the better grades the outer slices are omitted, so that the pack includes only the center slices, each of which has opposite, parallel plane surfaces.

Although machines have been heretofore proposed for slicing vegetables and classifying the slices in various ways, they are either of complicated costly design and subject to becoming out of order, or else do not efficiently perform the desired results. Other designs have proved unsuccessful because they damage the vegetables or improperly classify them, while some machines are open to both of these objections.

It is accordingly the major object of my invention to provide a novel slicing machine of simple rugged design, which will efficiently slice vegetables and the like and classify the slices, without damaging the vegetable or breaking the slices.

Another important object of the invention is to provide a novel machine which will cut a generally spherical article into a plurality of slices, and separate the outer slices from the center slices.

A further object of my invention is to provide a machine having rotary knives for cutting vegetables and the like into a plurality of slices, and means for separating the outer slices from the center slices.

My invention also aims to provide a novel machine for cutting articles into slices and which is so constructed that it may be adjusted to handle articles of various sizes, and also may be adjusted to cut slices of varying thickness.

Further objects will become apparent as the specification proceeds in connection with the drawings and from the appended claims.

In the drawings:

Figure 1 is a vertical sectional view through the shafts of the turret and rotating knife mechanism of a machine embodying my invention.

Figure 2 is a vertical sectional view taken substantially along the line 2—2 of Figure 1 showing the relationship of the hopper to the rotating structure.

Figure 3 is to top view on a reduced scale of the machine shown in Figure 1.

Figure 4 is a vertical sectional view taken substantially along the line 4—4 of Figure 3, looking in the direction of the arrows.

Figure 5 is a vertical sectional view taken substantially on the line 5—5 of Figure 3, looking in the direction of the arrows.

Referring to the drawings, wherein like reference characters have been employed to designate like parts throughout the several views thereof, my machine in general comprises a rotating structure A, carried by a base B, which conveys the articles to be sliced from a hopper C into a rotating knife assembly D, which cuts the articles into a plurality of slices. The top and bottom slices are automatically separated from the middle slices in a manner to be hereinafter pointed out.

Referring more particularly to Figure 1, base B is carried by supporting legs 9 or the like in any suitable manner. A drive shaft 10 is journalled in brackets 11 and 12 secured to the under side of base B, and may be manually rotated or coupled to any suitable prime mover. A bevel gear 13 is secured to shaft 10 and meshes with a bevel gear 14 carried by a shaft 15. The latter projects upwardly through the base and is journalled in a flanged bushing 16, carried by support 17, which may be secured to the upper side of the base by cap screws 18 or the like. Shaft 15 supports the knife structure, which will be hereinafter described.

Shaft 10 carries a second bevel gear 19 meshing with a large bevel gear 21 carried by a shaft 22. Shaft 22 projects up through the base and is journalled in a bushing 23 carried in a support 24, secured to the base by cap screws 25.

The rotatable structure or turret for transporting the articles to the slicing apparatus is carried by shaft 22 and comprises a flanged member 27, sleeved over shaft 22 and secured thereto by a key 28 or the like. Member 27 engages a flange 29 on shaft 22 and is journalled on the flange of bushing 23.

A plurality of centrally apertured plates 31 fit over member 27. Each plate is provided with a pair of keyways 32, so that the stack of plates, when mounted on member 27, as seen in Figure 1, may be keyed for rotation therewith by a pair of keys 33 and 34. Members 31 are secured in place by means of a heavy ring-like member 36, a washer 37, and a nut 38 threaded on the upper end of shaft 22. As seen in Figure 1, a clearance 39 exists between the end of member 27 and washer 37 so that, when nut 38 is threaded home, it will tightly clamp members 31 between member 36 in the flange on member 27, and in turn rigidly force member 27 against shoulder 29 on the shaft. The entire assembly is accordingly rigidly locked together for unitary rotation.

Each plate 31, outwardly or of the central or hub portion, assumes the form of a relatively thin disc, and is provided adjacent its periphery with a plurality of openings 41. The openings of the various plates are vertically aligned so that each vertically aligned series of openings forms an article receiving pocket 42, the spacing of plates providing slots through which the knives of the slicing mechanism may freely enter the pocket in a manner to be hereinafter described.

The articles may be fed to the rotatable structure in any desired manner but I preferably employ a hopper C located at one side of the machine and having vertical walls 43 and 44, and inclined walls 45 and 46. The lower part of the hopper is formed as a spout 47 and is located directly over openings 41, so that the articles 48 may freely drop into pockets 42 as they successively rotate past it. The front portion of the spout 47 is provided with a swinging gate 49 which may be gravity or spring actuated to prevent the articles from rebounding and possibly escaping from pockets 42.

The articles are retained in pockets 42 by means of a stationary plate 51 supported on base plate B by a plurality of brackets 52 or the like. As seen in Figure 3, plate 51 begins at the point 53, adjacent the mouth of the hopper and extends in a clockwise direction around to a point 54.

From the structure so far developed, it is apparent that rotatable structure A provides a plurality of pockets which receive articles from hopper C and slides them over plate 51 toward the cutting or slicing station. The preferred form of slicing mechanism will now be described.

Shaft 15 is provided with a shoulder 56 against which a thrust washer 57 seats. Sleeved over shaft 15 and bearing against the thrust washer are a plurality of circular knives 58, each of which is provided with an enlarged central or hub portion 59 having a pair of keyways 61 provided therein. A pair of keys 62 and 63 seat in the keyways of knives 58 and a pair of slots in shaft 15. The knives are retained in place by means of a washer 64 and a nut 65 threaded on shaft 15. By tightening nut 65, hub portions 59 of the knives are clamped together, and the assembly is forced against shoulder 56. During operation thrust washer 57 cooperates with the flange of bushing 16, and the hub of gear 14 cooperates with the lower side of base plate B to prevent any appreciable vertical movement of shaft 15, thereby accurately maintaining knife plate 58 in cooperating relationship to the slots of rotatable structure A. As seen in Figure 1, knives 58 project through pockets 42 as they successively reach the cutting station.

As hereinafter pointed out, a top slice of the vegetable or other article is separated from the remainder, and to facilitate this operation a scraper 67 is supported in close proximity to the uppermost knife blade and it is carried by a support 68 on any suitable stationary part of the machine. Member 67 cooperates with the upper slice of the article in the manner indicated by the dotted lines in Figure 3.

From the foregoing it is apparent that the novel supporting structure of the invention is of a sturdy construction, and by the use of a plurality of plates, which are of identical size and shape, they may be readily removed for repair and replacement, and also the machine may be easily and quickly adapted or adjusted to handle articles of various sizes. For instance, if it is desired to handle articles larger than that illustrated, member 36, washer 37 and nut 38 are removed and one or more additional plates 31 are put in place on shaft 22 to provide a larger pocket 42. Also, several sets of plates having larger and smaller sized openings 41 may be kept on hand and installed in the machine to take care of the particular article which it is desired to slice.

Whenever structure A is modified to incorporate one or more additional plates 31, washers 64 and nut 65 of the knife mechanism are removed and one or more knife blades 58 are put in place. Also, the thickness of the slices may be increased by omitting one or more alternate knife blades from the shaft. The machine is accordingly very flexible, easy to service and of rugged and yet simple construction.

*Operation*

Assuming that shaft 10 is rotated in a counterclockwise direction, (viewed from the left hand end of Figure 1) either by hand or any suitable form of prime mover, shaft 15 will rotate the knives at a higher angular speed than turret A, by reason of the particular gear ratio gearing shown. I prefer to rotate the knives at a considerably higher speed of the rate of advance of the article toward the knives, but it is to be understood that my invention is not limited to any particular ratio of gearing.

With shaft 10 rotating as just described, structure A rotates clockwise as seen in Figure 3, and as pockets 42 successively pass the spout of hopper C they receive an article 48. The articles are successively slid over plate 51 and carried into knives 58, which cut or slice the article into a plurality of center slices 71, a top slice 72, and a bottom slice 73, as seen in Figure 4.

Referring particularly to Figures 3 and 4, plate 51 is provided with an opening 74 which is preferably so located that when knives 58 have cut approximately halfway through them, it will no longer support the bottom portion of the article, and as soon as each article has been cut completely through, the bottom slice 73 will drop away into a chute or suitable container not shown. In this way the bottom slice is efficiently separated from the remainder of slices 71, without damaging either, and as an incident to the cutting operation.

The other wall of opening 74 is so located that when the articles successively pass out at the knives and are no longer supported thereby, they gravitate down to plate 51 and are supported on it, as indicated in the left-hand side of Figure 5.

In the meantime, top slice 72 is carried around on the top knife 58, engages scraper 67, and is discharged into a second hopper or chute. The center slices, after gravitating to plate 51, are slid along until point 54 is reached, where, as seen in Figure 5, they are discharged over edge 54 into a suitable chute or container, and constitute the preferred product. For instance, if vegetables are being prepared for canning, the product will consist of only the highly desirable center slices.

It is accordingly apparent that I have provided a novel machine which will efficiently slice vegetables or other articles into a plurality of slices and separate the top and the bottom slices from the center slices without damaging them in any way, and that my improved slicing machine is rugged, simple in design and made up of a minimum number of readily interchangeable and replaceable parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a slicing machine, a structure mounted for rotation about a substantially vertical axis, and having a plurality of pockets, each being open at its top and bottom and having walls provided with substantially horizontal openings, said structure being operable to successively carry said pockets past a feeding station, a cutting station and a discharge station; means for introducing articles into said pockets at said feeding station; means for supporting said articles as they travel from said feeding station to said cutting station; a plurality of knives mounted for rotation about an axis substantially parallel to the axis of said structure, and operable to successively project into said pockets through said horizontal openings as they pass said cutting station for cutting said articles into a plurality of slices, the upper of said knives being operable to carry away the top slice; and means engaging the top slice carried by said knife to remove it from the machine.

2. In a slicing machine, a structure mounted for rotation about a substantially vertical axis, and having a plurality of pockets, each being open at its top and bottom and having walls provided with substantially horizontal openings, said structure being operable to successively carry said pockets past a feeding station, a cutting station and a discharge station; means for introducing articles into said pockets at said feeding station; means for supporting said articles as they travel from said feeding station to said cutting station; a plurality of knives mounted for rotation about an axis substantially parallel to the axis of said structure, and operable to successively project into said pockets through said horizontal openings as they pass said cutting station for cutting said articles into a plurality of slices, the upper of said knives lying in a plane above the top of said structure so as to retain the top slice; means for removing the top slice from said upper knife to a point of discharge; said support terminating at the cutting station whereby the bottom slice is discharged at said cutting station; and a second support extending from the cutting station to the discharge station, slightly underlying and overlapping the edge of the lower of said knives to retain the remainder of the slices in said pockets during movement thereof to the discharge station.

3. In a slicing machine, a structure mounted for a rotation about a substantially vertical axis, and having a plurality of pockets, each being open at its top and bottom, and having walls provided with substantially horizontal openings, said structure being operable to successively carry said pockets past a feeding station and a cutting station; means for introducing articles into said pockets at said feeding station; means supporting said articles in said pockets with their tops projecting out of the tops of said pockets as they travel from said feeding station to said cutting station; a plurality of knives mounted for rotation about an axis substantially parallel to the axis of said structure, and operable to successively project into said pockets through said horizontal openings as they pass said cutting station for cutting said articles into a plurality of slices; means for rotating said knives, the upper of said knives being above the top of said pockets and operable to carry away and discharge the top slice, and said supporting means being operable to successively release the bottom slices while the remaining slices are supported by said cutting means.

4. In a slicing machine, a structure mounted for rotation about a substantially vertical axis, and having a plurality of pockets, each being open at its top and bottom, and having walls provided with substantially horizontal openings, said structure being operable to successively carry said pockets past a feeding station, a cutting station and a discharge station; means for introducting articles into said pockets at said feeding station; means supporting said articles in said pockets with their tops projecting above the pockets as they travel from said feeding station past said cutting station; a plurality of knives mounted for rotation about an axis substantially parallel to the axis of said structure, the upper knife being above the top of said structure and the remaining knives being operable to successively project into said pockets through said horizontal openings as they pass said cutting station for cutting said articles into a plurality of slices; means for rotating said knives; means for discharging the upper and bottom slices of the article substantially at the cutting station, and a support underlying the edge of the bottom knife for retaining the remainder of the slices in said pockets during movement thereof to the discharge station.

FRED A. BUCKLIN.